United States Patent
Lichi

(10) Patent No.: US 6,799,613 B2
(45) Date of Patent: Oct. 5, 2004

(54) DEVICES AND METHOD FOR PREPARING BEVERAGES, PARTICULARLY CAFÉ AU LAIT

(75) Inventor: Yuval Lichi, Kibbutz Ramat Rachel (IL)

(73) Assignees: Kibbutz Ramat Rachel (IL); Doar Na Zafon Yehuda (IL)

( * ) Notice: Subject to any disclaimer, the term of this patent is extended or adjusted under 35 U.S.C. 154(b) by 58 days.

(21) Appl. No.: 10/046,188

(22) Filed: Jan. 16, 2002

(65) Prior Publication Data

US 2002/0090439 A1 Jul. 11, 2002

Related U.S. Application Data

(63) Continuation of application No. PCT/IL01/00831, filed on Sep. 5, 2001.

(30) Foreign Application Priority Data

Nov. 7, 2000 (IL) .................................................. 139534

(51) Int. Cl.[7] ............................ B67C 3/00; A47J 31/41; A47J 31/44

(52) U.S. Cl. ........................ 141/286; 426/594; 426/590; 426/249; 141/100; 220/592.17

(58) Field of Search ................................ 141/286, 100; 426/590, 594, 249; 220/592.17

(56) References Cited

U.S. PATENT DOCUMENTS 4,126,164 A   11/1978  Magnifico
5,852,966 A * 12/1998  Hursh

FOREIGN PATENT DOCUMENTS

AU           706970      7/1999
JP          08150080   * 6/1996

* cited by examiner

Primary Examiner—Anthony Weier
(74) Attorney, Agent, or Firm—G.E. Ehrlich (1999) Ltd.

(57) ABSTRACT

A device and method for preparing café au lait by introducing milk into a drinking vessel to a level below its open top; and introducing hot coffee into the drinking vessel via a flow restrictor member formed with a plurality of holes of such size, number and distribution to permit the coffee to flow therethrough at a sufficiently slow rate to form a distinct layer over the milk with a minimum of turbulence and mixing with the milk.

14 Claims, 9 Drawing Sheets

DEVICES AND METHOD FOR PREPARING BEVERAGES, PARTICULARLY CAFÉ AU LAIT

This application is a continuation of co-pending PCT Application No. IL 01/00831, filed Sep. 5, 2001.

FIELD AND BACKGROUND OF THE INVENTION

The present invention relates to a method and devices for preparing beverages of the type that includes multiple liquids. The invention is particularly useful for preparing café au lait, and is therefore described below with respect to this application.

Ambiance is an essential element of the food and beverage service industry. An establishment's success or failure often depends upon the mood created therein. The efficiency of the service and the appearance of the food and beverages served are critical elements that influence the popularity of restaurants. Accordingly, food service establishments strive to offer a menu of popular dishes presented in an attractive and efficient manner.

A very popular beverage, particularly in coffee shops, is café au lait, served in a layered fashion within the drinking vessel. This beverage consists of a layer of hot coffee above a layer of steamed milk presented to the diner unmixed in a vessel made of transparent material such as clear glass. After admiring the seeming impossibility of the spectacle, the diner then has the option of sipping from the top layer or mixing both layers together. Indeed, with the advent of the rising popularity of coffee, café au lait, particularly in such an elegant layered presentation, is a very popular drink for home consumption.

This beverage is typically prepared in a time-consuming two-step process. First the milk is placed into the drinking vessel. Thereafter the coffee is very slowly introduced into the vessel in such a way that it does not mix with the milk, but remains "floating" above it. This is done by slowly dripping the hot coffee over an object such as a spoon held above the layer of milk or by tilting the vessel and slowly allowing the coffee to flow down the wall of the vessel and onto the layer of milk. Such a layer separation is physically possible because of the higher temperature and lower density of the hot coffee as well as the surface tension existing above the layer of milk. These conditions may be overcome by mechanically mixing the two fluids, as by stirring, shaking, or introducing the coffee in a vigorous fashion such that it pierces the surface of the milk and causes turbulence to effect the mixing of the two fluids.

The preparation of this beverage is problematic in two significant respects. First, it is dependent upon the manual dexterity of the server. It is critical that the coffee be introduced at a slow rate dispersed over a large surface area in order to avoid mixing. A mistake cannot be hidden; a new serving must be prepared, at a cost of consumable materials as well as the time of the server and the dishwasher. Second, the necessarily slow process consumes the valuable time of the server, who must be physically present during the entire process of introducing the coffee into the vessel. This is exacerbated if multiple servings must be prepared.

There is thus a widely recognized need for a device that will achieve this result effectively and without the attendance of a person during the process.

SUMMARY OF THE INVENTION

Accordingly, it is an object of the present invention to provide a novel method and device for preparing beverages consisting of two different liquids in such a manner that the two liquids do not mix but remain in layers, one above the other.

According to one aspect of the present invention there is provided a device for preparing a beverage including a first liquid and a second liquid of lower density than the first liquid in a drinking vessel, comprising a flow restrictor member through which the second liquid is transferred into the drinking vessel after the first liquid has been introduced therein, the flow restrictor member being formed with a plurality of holes therethrough of such size, number and distribution to permit the second liquid to flow therethrough at a rate such that the second liquid forms a distinct layer over the first liquid with a minimum of turbulence and mixing with respect to the first liquid.

According to a further aspect of the present invention there is provided a method of preparing a beverage, preferably café au lait, including a first liquid and a second liquid of lower density than the first liquid in a drinking vessel comprising introducing the first liquid into the drinking vessel and introducing the second liquid into the drinking vessel via a flow restrictor member formed with a plurality of holes therethrough of such size, number and distribution to permit the second liquid to flow therethrough at a sufficiently slow rate to form a distinct layer over the first liquid with a minimum of turbulence and mixing with respect to the first liquid.

According to features in the described preferred embodiments the first liquid is milk and the second liquid is selected from the group consisting of hot coffee, cocoa and tea.

According to features in the described preferred embodiments the flow restrictor member is removably supported on the open top of the drinking vessel at the time the second liquid is introduced into the drinking vessel over the first liquid.

According to features in the described preferred embodiments the second liquid is introduced into the drinking vessel from a container via the flow restrictor member carried by the container.

According to features in the described preferred embodiments the flow restrictor member includes a bottom wall formed with a plurality of holes formed therein.

According to features in the described preferred embodiments the device includes an outer supporting section or a separate supporting member, each of which extends below the bottom wall of the flow restrictor and terminates in a peripheral flange engageable with the open top of the drinking vessel for removably supporting the flow restrictor on the drinking vessel.

According to features in the described preferred embodiments the peripheral wall is formed with holes to permit vapor to pass therethrough.

According to features in the described preferred embodiments the well member is disposable after use.

According to features in the described preferred embodiments at least one of the well members and the supporting member are packaged together as a kit.

The present invention successfully addresses the shortcomings of the presently known configurations by providing a novel yet simple solution for the problems associated with preparing layered beverages.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
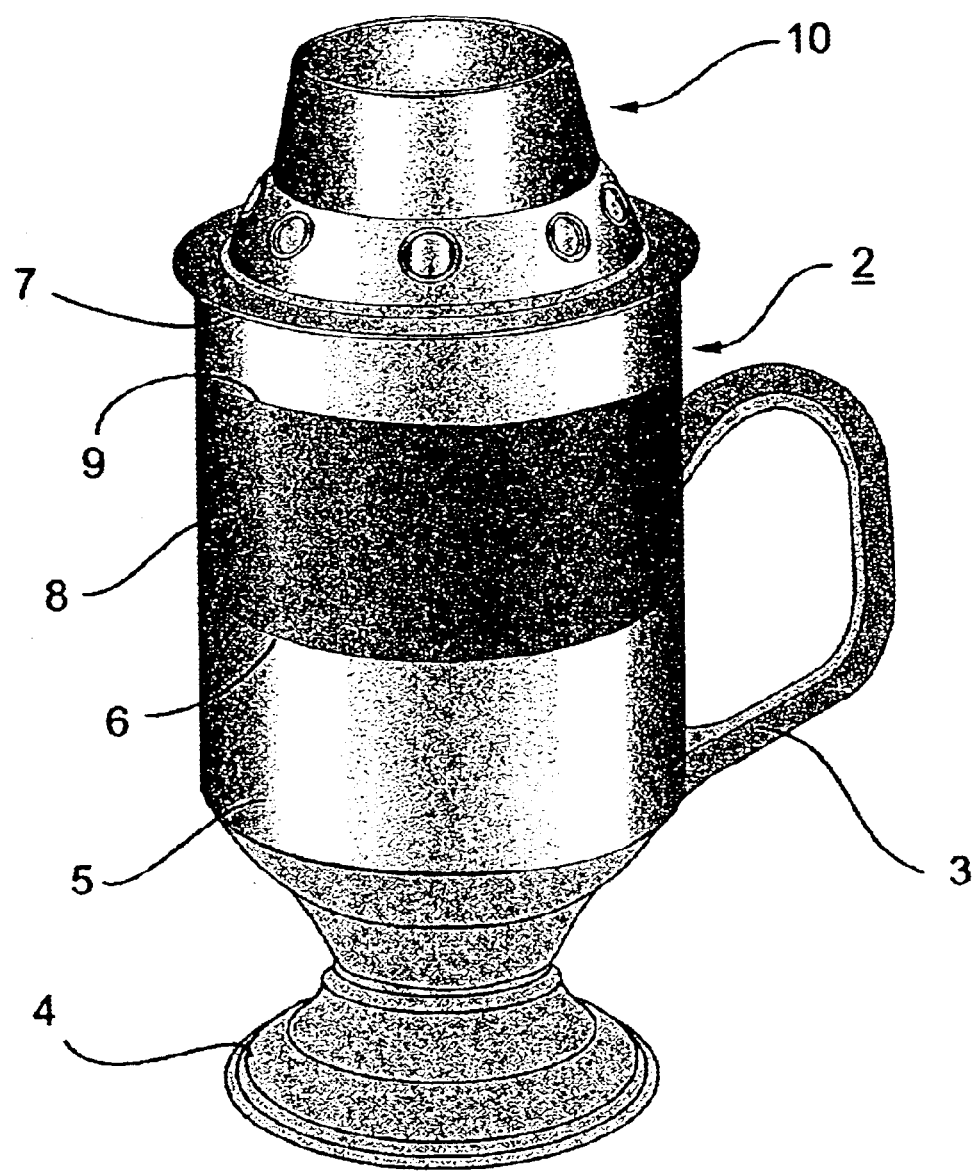
FIG. 1 illustrates a drinking vessel including a flow restrictor member constructed in accordance with a preferred embodiment of the present invention removably supported thereon.

Before describing the illustrated embodiments of the invention, it is to be understood that the invention is not limited in this application to the details of construction and the arrangement of the components set forth in the following description or illustrated in the drawings. The invention is applicable to other embodiments and may be practiced or carried out in other ways. Also, it is to be understood that the phraseology and terminology employed herein are for the purpose of description and should not be regarded as limiting.

The principles and operation of a device and method for preparing beverages according to the present invention may be better understood with reference to the drawings and accompanying descriptions.

Reference is now made to FIG. 1 which shows a drinking vessel, in the form of a cup 2, having a handle 3, and a base 4, for use in preparing café au lait in accordance with the present invention. For this purpose, milk, shown at 5, is first introduced into cup 2 to a level designated 6 below the open top 7 of cup 2. Thereafter, hot liquid coffee is introduced into cup 2 to form a distinct layer, as shown at 8, over the milk, thus filling cup 2 to a level designated 9.

Café au lait is prepared with the use of a flow restrictor member, hereinafter referred to as flow restrictor 10, applied to the open top of cup 2 through which the hot liquid coffee is introduced. As described more fully below, flow restrictor 10 is formed with a plurality of holes of sufficiently small size, number and distribution to permit the coffee to flow through the holes at a sufficiently slow rate to form a distinct layer over the milk with a minimum of turbulence and mixing with respect to the milk.

Figure 2:
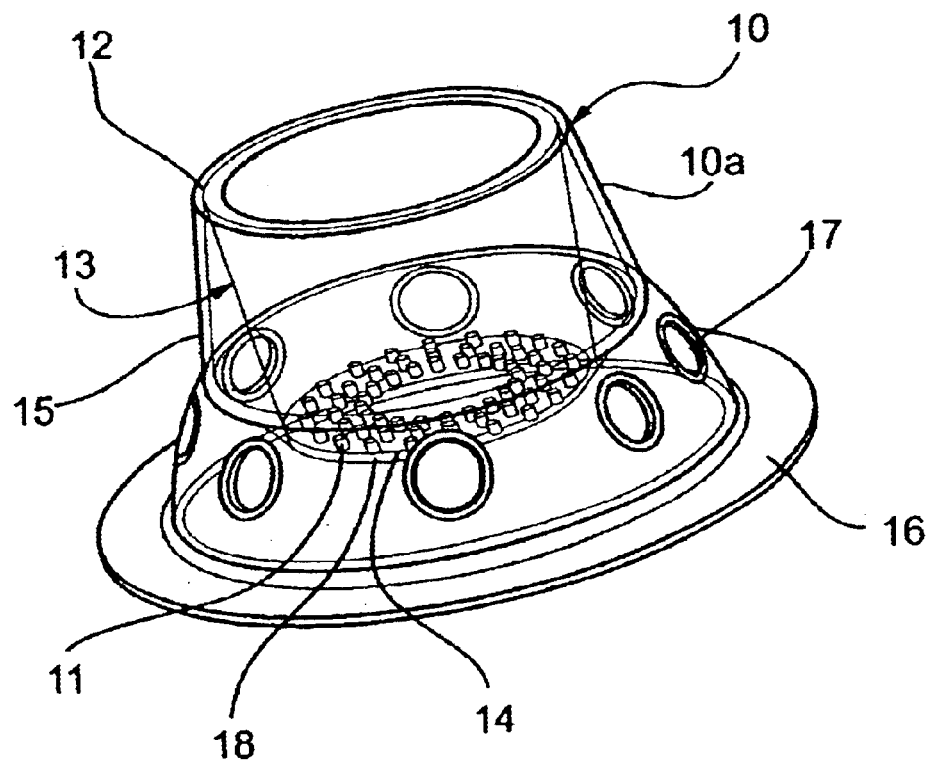
FIG. 2 is a perspective view of the flow restrictor member of FIG. 1.
Figure 3:
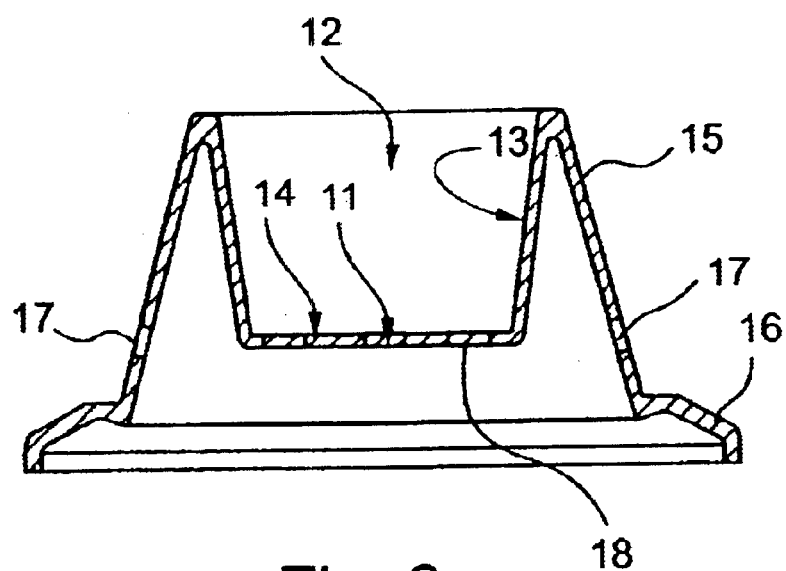
FIG. 3 is a side view section of the flow restrictor member of FIG. 1.
Figure 4:
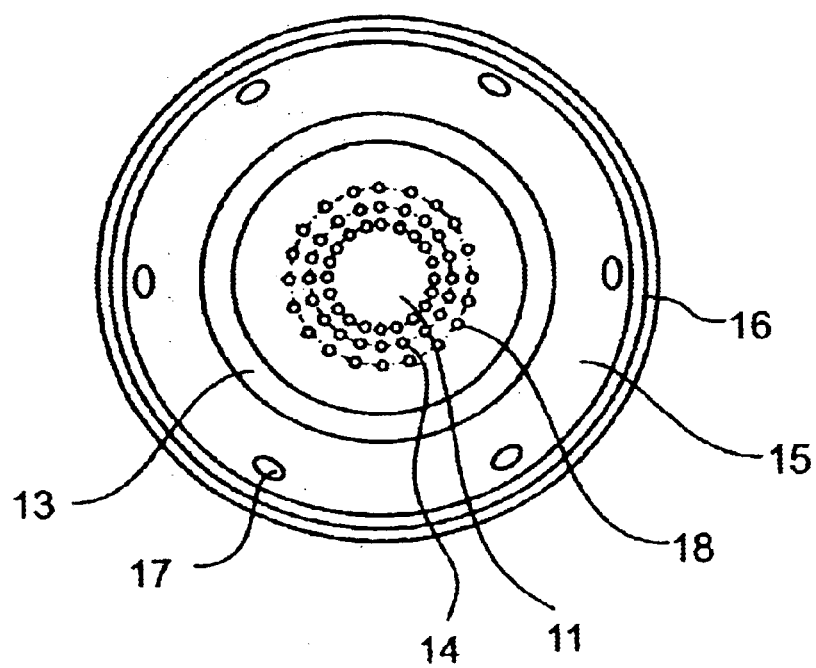
FIG. 4 is a bottom view of the flow restrictor member of FIG. 1.

Reference is now made to FIG. 2 which illustrates a preferred embodiment of flow restrictor 10. Flow restrictor 10 comprises a perforated surface 11, which contains a plurality of holes, hereinafter referred to in their aggregate as holes 18. Flow restrictor 10 is formed with an inner well section 12, that can contain a liquid. Well 12 has a cylindrical side wall 13, and a flat bottom 14, which includes the perforated surface 11.

According to the illustrated preferred embodiment, perforated surface 11 is of circular configuration, conforming to the shape of bottom 14 of well 12. Well 12 is designed to receive a quantity of a liquid and to allow that liquid to pass therefrom via perforated surface 11 in bottom 14.

Well 12 is circumscribed by an outer supporting section 15, which extends below the level of bottom 14 of well 12 and terminates with a radially extending flange 16, circumferential to its base. Outer supporting section 15 is formed with a plurality of holes 17, arranged circumferentially just above flange 16 for the purpose of allowing vapor to escape from the vessel. Holes 17 also serve a decorative function.

Flow restrictor 10 is removably engageable with open top 7 of cup 2 by means of flange 16 at its base. By so engaging cup 2, flow restrictor 10 is supported by cup 2 so that perforated surface 11 is positioned directly above open top 7 of cup 2, allowing the coffee within well 12 to flow through the perforated surface 11 directly and slowly into cup 2.

FIGS. 6–9 illustrate another embodiment of the invention wherein the flow restrictor member, generally designated 21, is incorporated in a container 20 for coffee in the shape of a pitcher or carafe, with the flow restrictor member 21 built into its lid 26. Lid 26 carries flow restrictor 21 on its spout 22, so that the flow of the coffee is restricted when poured from spout 22 of container 20.

Container 20 comprises an outer wall 23; a bottom 24 which serves as a base for container 20; and lid 26 incorporating spout 22 through which the coffee is poured. Flow restrictor 21 on spout 22 restricts the flow of coffee when poured from container 20 in the same manner as flow restrictor 10 described above with respect to FIGS. 1–5 restricts the flow of coffee from well 12.

A relevant feature of flow restrictors 10 and 21 as described above with respect to FIGS. 1–5 and FIGS. 6–9, respectively, is the configuration and distribution of the holes therein. Flow restrictors 10 and 21 comprise a defined area containing a specific number of holes, each with a specific diameter and arranged in a specific pattern. According to the preferred embodiment illustrated in FIGS. 1–5, perforated surface 11 preferably contains fifty-two holes 18 symmetrically dispersed over a surface area preferably containing 94 square cm. Each of holes 18 is preferably of circular configuration with a preferred diameter of 0.80 mm. Holes 18 preferably comprise, in their aggregate, no less than 2% nor more than 13.56% of the surface area of perforated surface 11. This combination of the number of holes 18, the diameter of holes 18, and the pattern of holes 18 preferably results in a rate of flow of 0.10 liter per 8–12 seconds.

The function of flow restrictors 10 and 21 is to restrict the flow of coffee from well 12 and container 20 respectively. The physical principals governing this process relate to the fluid dynamics of the hot coffee passing through the perforated surface. The factors involved are the following:

a. the viscosity of the fluid, which is determined by its specific gravity and its temperature;

b. the propensity of a fluid to adhere to a surface with which it comes into contact, which is a directly related to the surface area;

c. the friction caused by the flow of a fluid over a surface, which is influenced by the surface's smoothness, contour and quantity of surface area as well as by the speed and quantity of the fluid; and d. the force applied to the fluid causing its movement.

Figure 5:
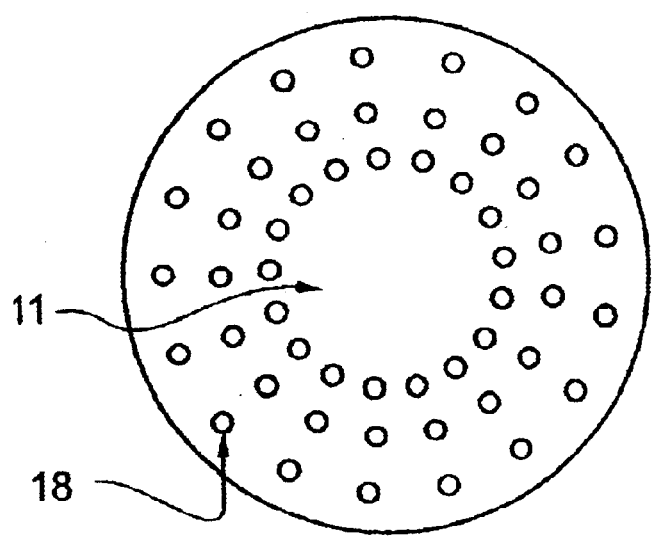
FIG. 5 is a fragmentary view of the perforated surface of the flow restrictor member of FIG. 1 depicting its dimensions and the size and configuration of the holes therein.
Figure 6:
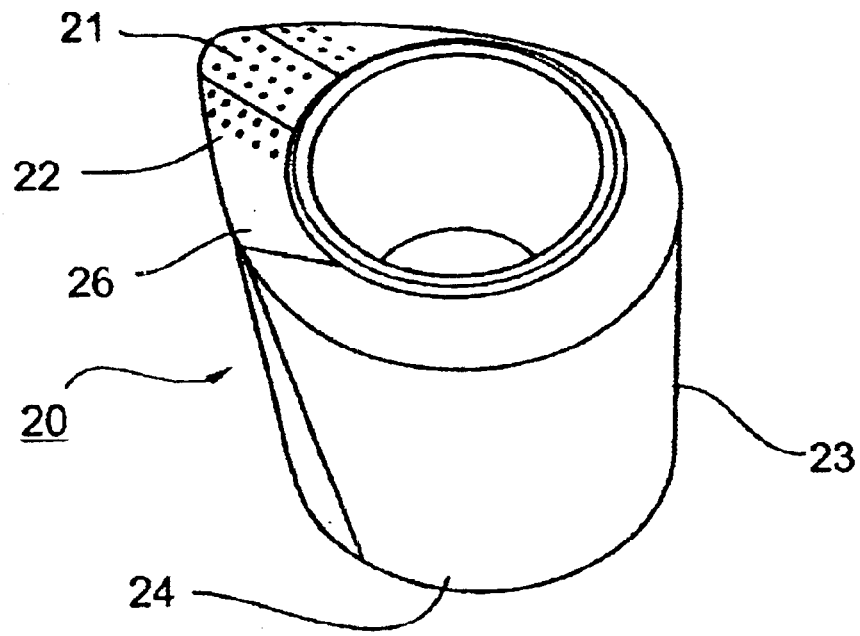
FIG. 6 is a perspective view of a container carrying a flow restrictor member constructed according to a second embodiment of the invention.
Figure 7:
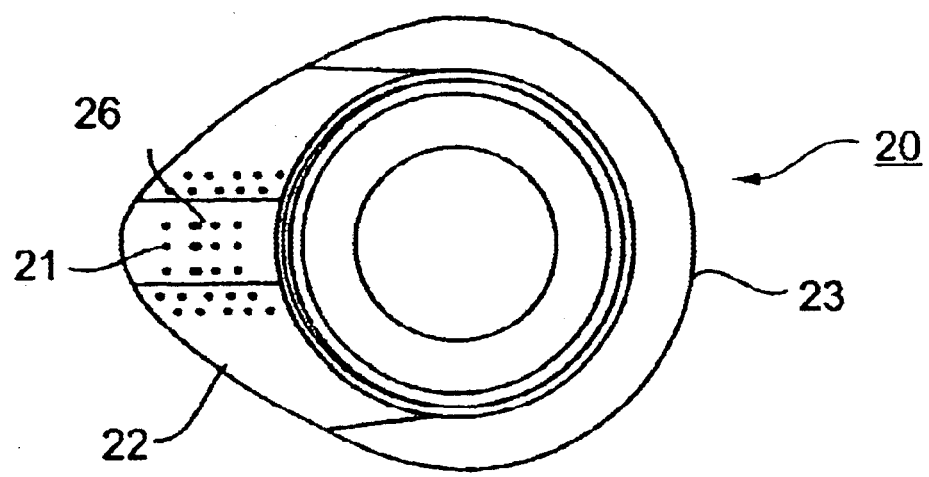
FIG. 7 is a top view of the container of FIG. 6.
Figure 8:
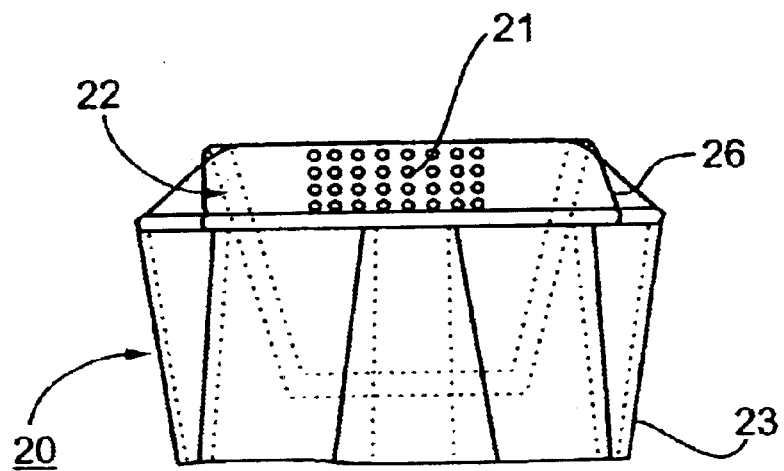
FIG. 8 is a front view of the upper part of the container of FIG. 6.
Figure 9:
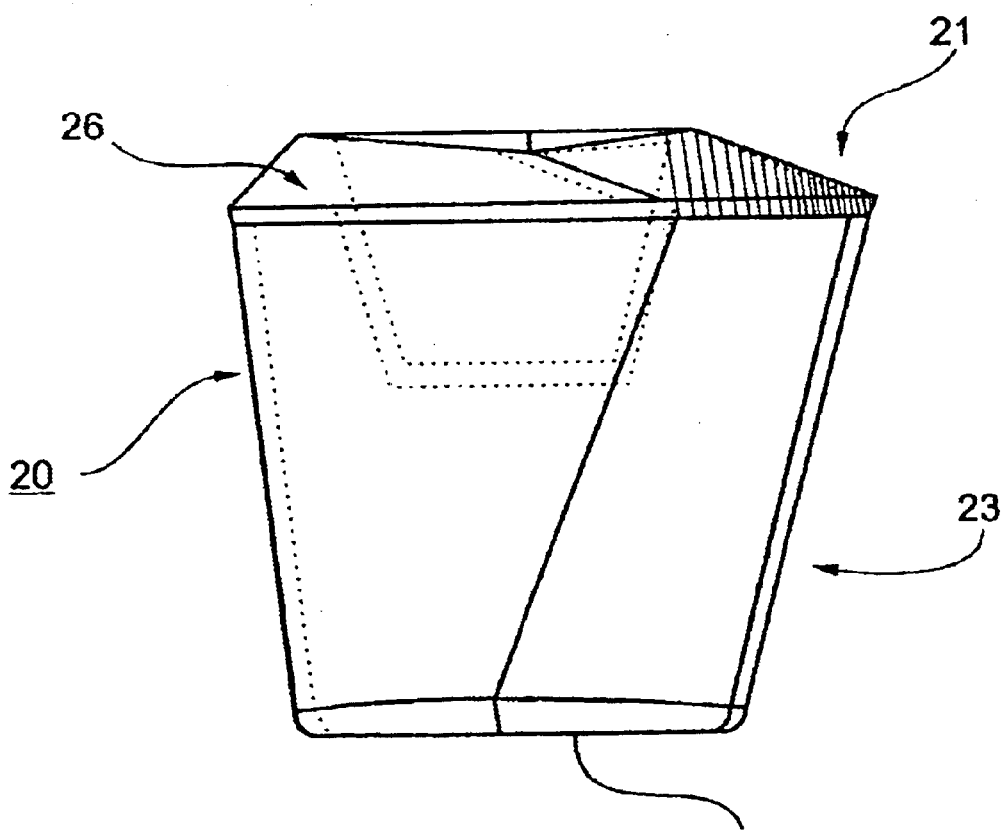
FIG. 9 is a side view of the container of FIG. 6.

Taking into account all of the above factors, FIG. 5 illustrates the pattern, size and shape of holes 18 within perforated surface 11 that will allow a fluid with the specific gravity of the coffee customarily served, at a temperature preferably in excess of 90 degrees C. to flow by gravity alone in such a manner that the fluid remains floating upon the surface of milk with a minimum of mixing with the milk.

Accordingly, the method of making café au lait employing flow restrictor 10 consists simply of introducing steamed milk into a drinking vessel, placing flow restrictor 10 on the drinking vessel, and introducing hot coffee into flow restrictor 10. The coffee will flow from flow restrictor 10 into the drinking vessel by force of gravity alone, in a manner such that there is limited mixing with the milk, the coffee remaining "floating" above it.

Figure 10:
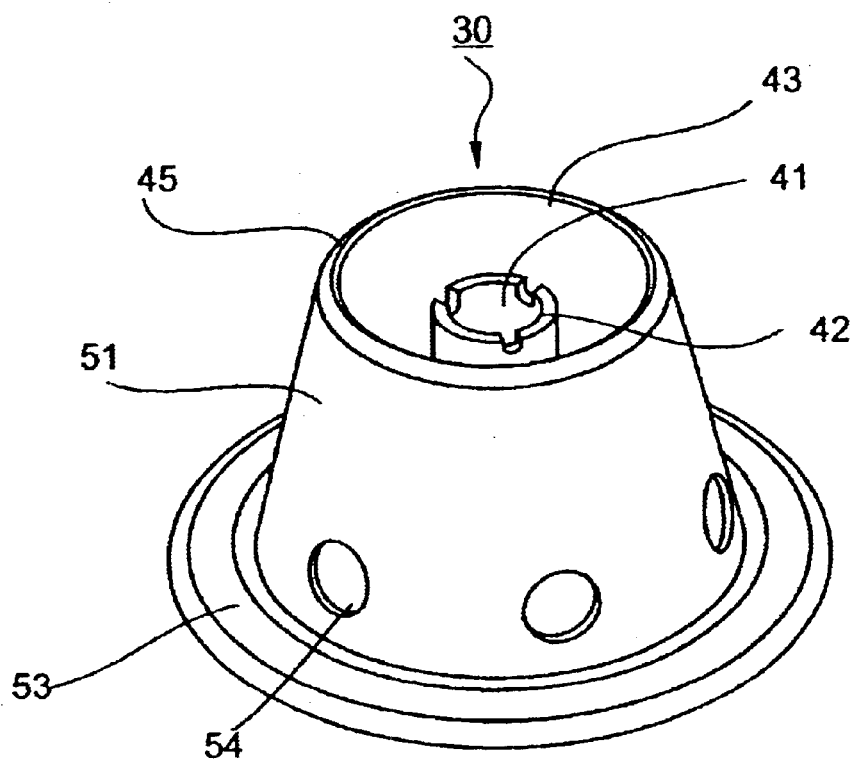
FIG. 10 is a top perspective view of a two-part device constructed in accordance with a third embodiment of the present invention.
Figure 11:
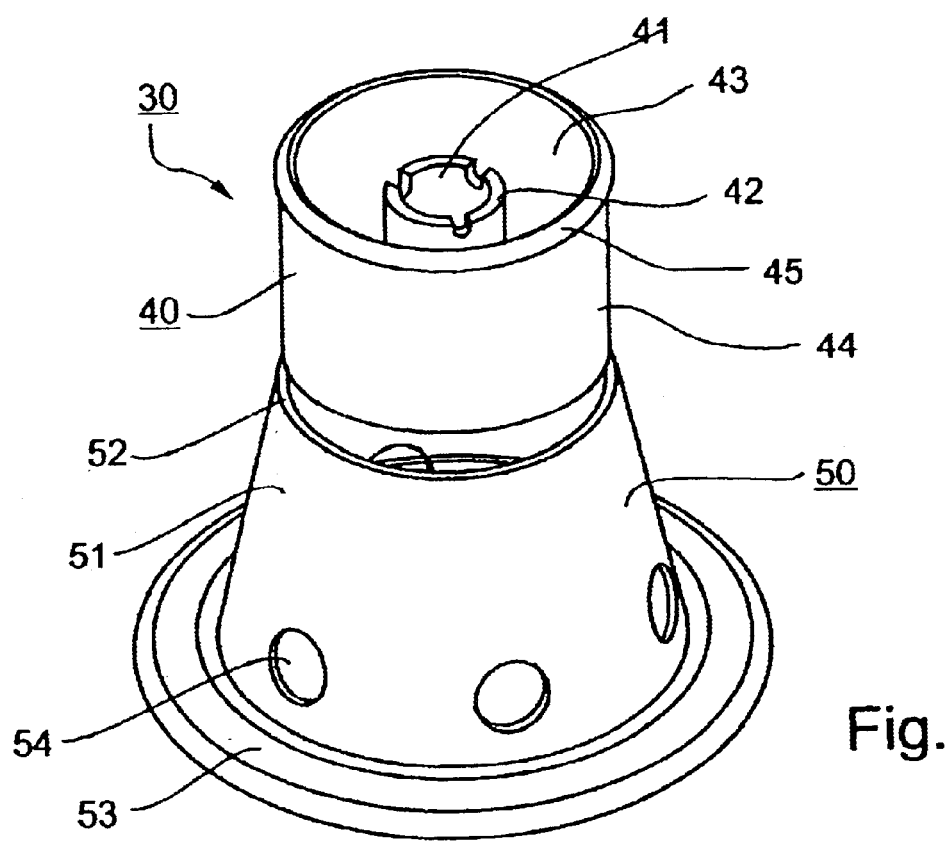
FIG. 11 is an exploded top perspective view of the two-part device of FIG. 10.

Reference is now made to FIGS. 10–18 which illustrate a two-part device, generally designated 30, representing a further alternative embodiment of the invention, Two-part device 30 is shown in assembled configuration in FIG. 10 and in exploded configuration in FIG. 11.

The illustrated two-part device 30 comprises a flow restrictor member, generally referred to as flow restrictor 40, and a supporting member, generally referred to as supporting member 50, for removably supporting flow restrictor 40 over the open top of a drinking vessel.

Flow restrictor 40 comprises a peripheral wall 44 closed at its lower end by a bottom wall 46 and open at its upper end. Flow restrictor 40 also includes a hollow tube 42 fixed centrally to bottom 46 which defines an inner well 41 within the hollow tube and an outer well 43 between the hollow tube and wall 44. According to the illustrated embodiment, inner well 41 is located coaxially with second section 43 and enclosed within second section 43, separated by the wall of hollow tube 42. It is appreciated that inner well 41 and outer well 43 may be configured differently within flow restrictor 40, provided that a separating wall isolates them one from another such that their respective contents do not mix with one another.

The upper end of wall 44 has a protruding lip 45 radiating circumferentially. Lip 45 is sized and configured for mounting flow restrictor 40 centrally within supporting member 50. Accordingly, lip 45 extends radially from wall 44 and reverts parallel to wall 44 in a direction toward the bottom of flow restrictor 40, forming a channel therebetween with a gap sufficient to snugly engage supporting member 50, preferably held in place by gravity.

Supporting member 50 comprises a peripheral wall 51 in a cylindrical shape of diminishing diameter from bottom to top. The top end of wall 51, hereinafter referred to as rim 52, is dimensioned to accept therein wall 44 of flow restrictor 40 and is designed and configured to engage lip 45 when flow restrictor 40 is centrally mounted on supporting member 50. Wall 51 terminates at its bottom in a flange 53 radiating circumferentially therefrom, being designed and configured to engage the open top of a drinking vessel. It is appreciated that drinking vessels come in many shapes and sizes. Accordingly, wall 51 and flange 53 may vary in their shape and size in order to accommodate the relevant drinking vessel.

Figure 12:
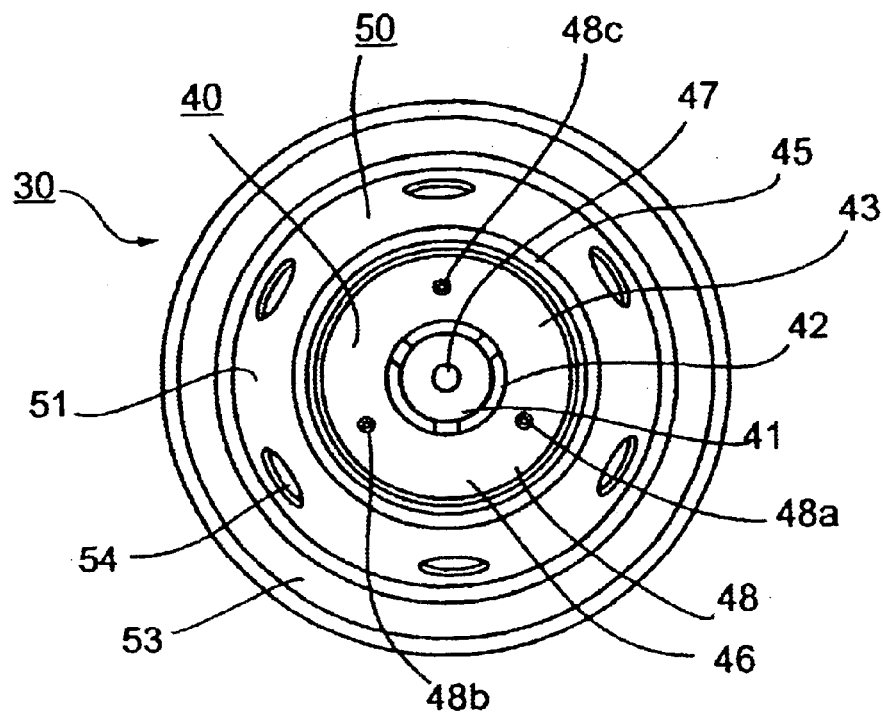
FIG. 12 is a top view of the two-part device of FIG. 10.

Reference is now made to FIG. 12 which shows the interior of flow restrictor 40. Bottom 46 of flow restrictor 40 is attached around its circumference to the lower end of wall 44. This attachment is sealed and impervious to the penetration therethrough of liquids.

Bottom 46 serves as a bottom for both inner well 41 and outer well 43, closing both and rendering both capable of containing a liquid. The section of bottom 46 that closes inner well 41 has one hole 47 formed within it which allows the flow therethrough of the liquid contained in inner well 41. The section of bottom 46 that closes outer well 43 carries a perforated surface 48, which allows the flow of the liquid contained in outer well 41.

Figure 13:
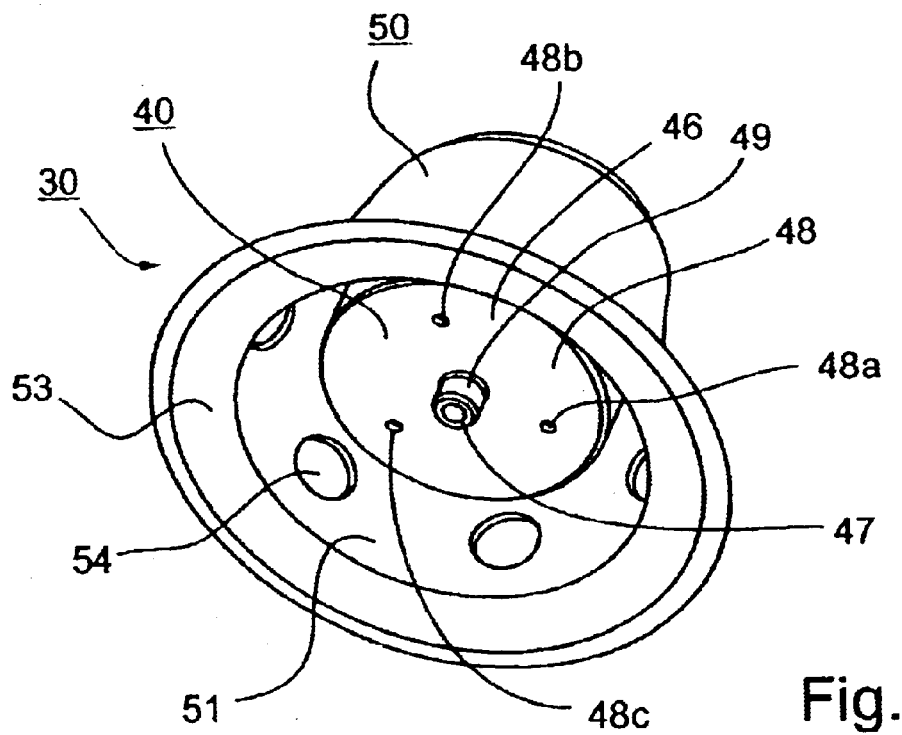
FIG. 13 is a bottom perspective view of the two-part device of FIG. 10.
Figure 14:
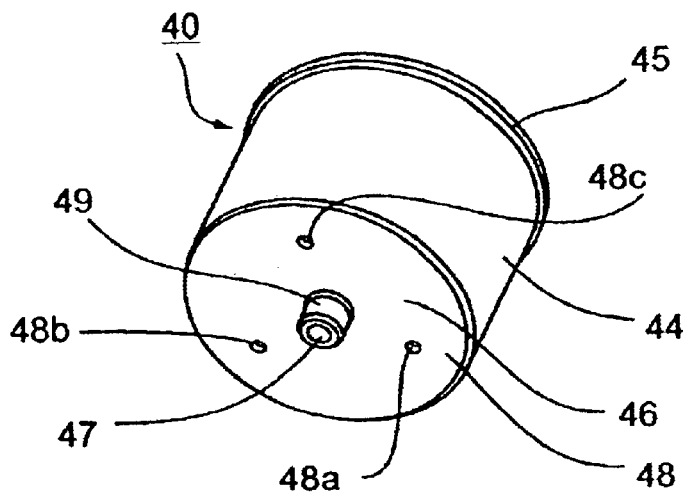
FIG. 14 is a bottom perspective view of the flow restrictor member of the two-part device of FIG. 10.

Reference is now made to FIGS. 13 and 14, which depict the underside of two-part device 30 and particularly bottom 46 which is formed with hole 47 and perforated surface 48. Hole 47 is formed in the portion of bottom 46 which closes inner well 41 and, according to the alternative embodiment, consists of a single hole. Hole 47 is surrounded by a projection extending downwardly from bottom 46, defining a nozzle 49, which serves to direct the flow of the liquid through hole 47 in the form of a stream. Perforated surface 48 is formed in bottom 46 which closes outer well 43 and comprises an annular array of three holes, 48a, 48b and 48c respectively.

FIG. 14 provides a similar view of the underside of flow restrictor 40 dismounted from supporting member 50 wherein bottom 46, hole 47, and perforated surface 48 bearing holes 48a, 48b and 48c are clearly shown. Also shown are wall 44 and lip 45.

Figure 15:
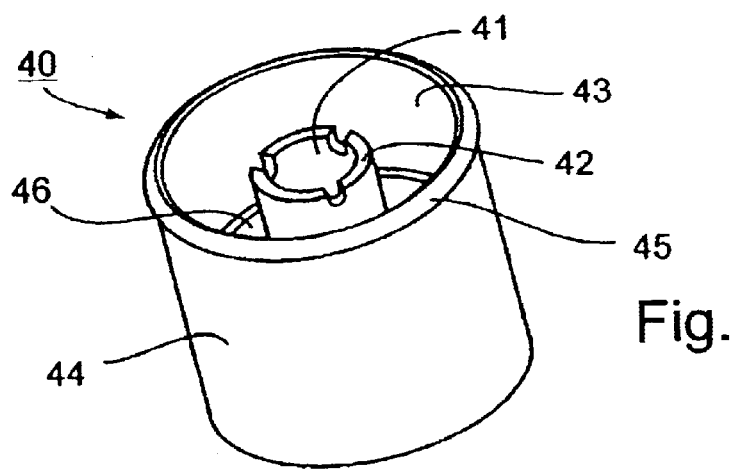
FIG. 15 is a top perspective view of the flow restrictor member of FIG. 14.

FIG. 15 is a top perspective view of flow restrictor 40 dismounted from supporting member 50, wherein inner well 41 and outer well 43 are shown separated by the wall of hollow tube 42. Inner well 41 and outer well 43 are shown open at their tops to facilitate the introduction therein of the liquid.

Figure 16:
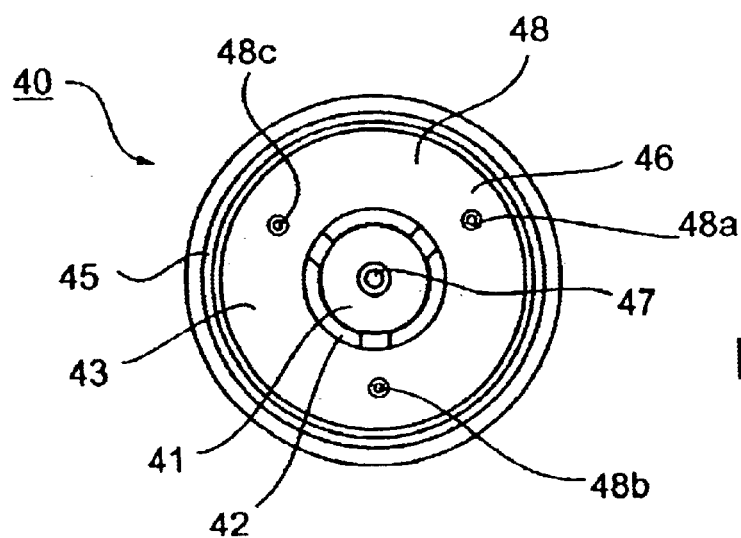
FIG. 16 is a top view of the flow restrictor member of FIG. 14.

FIG. 16 shows bottom 46 bearing hole 47 within inner well 41 and bearing perforated surface 48 within outer well 43. Hole 47 has a preferred diameter of 2.8 mm., and holes 48a, 48b and 48c each have a preferred diameter of 1.1 mm. The dimensions and configuration indicated result in a relatively rapid flow of the second liquid through hole 47 which allows it to mix slightly with the first liquid, and a relatively slow, restricted flow of the second liquid through holes 48a, 48b and 48c which limits, preferably prevents, the mixing iof the second liquid with the first liquid. It is understood that the number, dimensions and configuration of holes in bottom 46 may vary depending upon the properties of the liquids constituting the beverage being prepared.

Figure 17:
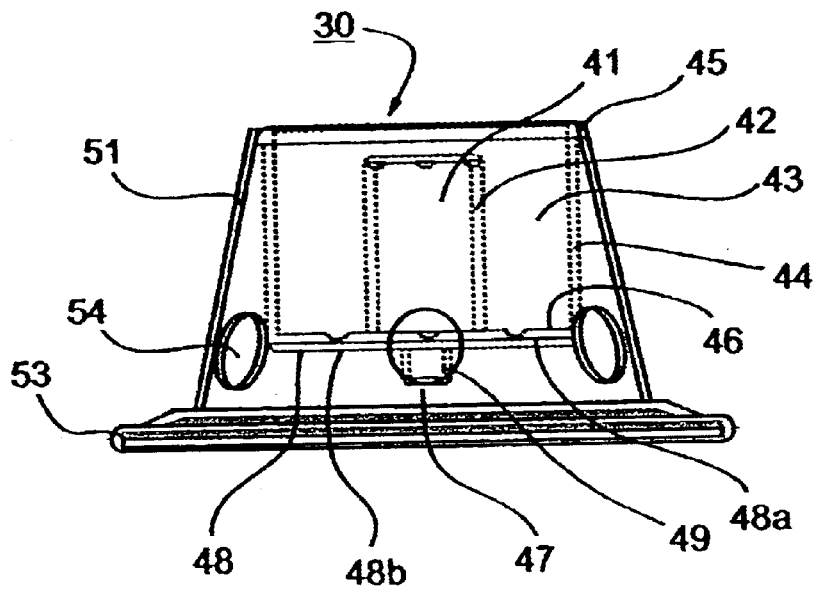
FIG. 17 is a side elevational view of the two-part device of FIG. 10 in assembled condition.

FIG. 17 shows flow restrictor 40 mounted within supporting member 50. Viewed in this relationship, it is clear how the illustrated embodiment is supported atop a drinking vessel. Flange 53 radiates circumferentially from the bottom of wall 51 to engage the top rim of the drinking vessel.

Wall 51 of supporting member 50 extends below bottom 46 of flow restrictor 40. Held in this relationship, hole 47 and perforated surface 48 are poised above the open top of the drinking vessel such that their respective liquids may flow therein. Wall 51 is shown bearing holes 54 which serve the practical function of venting the interior of supporting member 50 to the atmosphere and thereby preventing a pneumatic lock which may disrupt the flow through holes 47, 48a, 48b and 48c. Holes 54 are arrayed circumferentially around wall 51, thereby also serving a decorative function. They also allow the aromatic vapors of the hot beverage within the drinking vessel to escape to the atmosphere.

Figure 18:
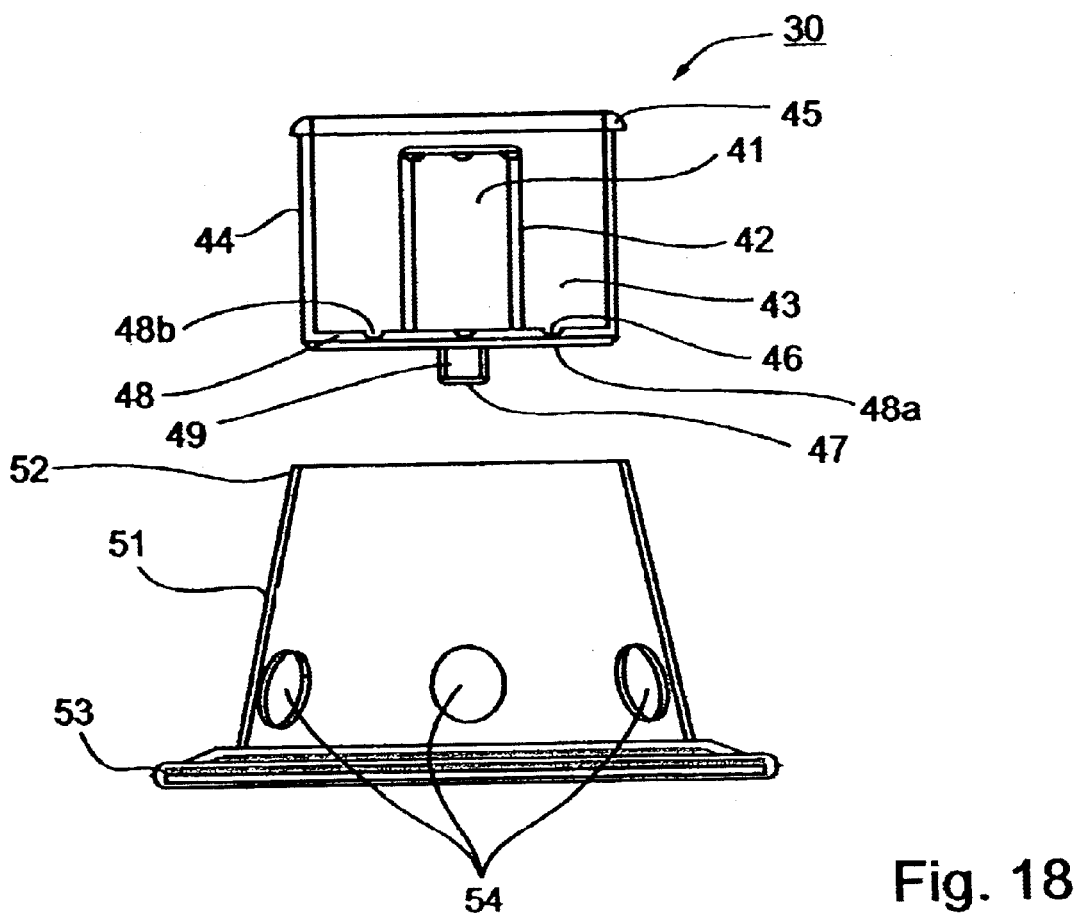
FIG. 18 is an exploded view of the two-part device of FIG. 10 with the flow restrictor member separated from the supporting member.

FIG. 18 shows flow restrictor 40 dismounted from supporting member 50. According to the alternative embodiment, the height of flow restrictor 40 is preferably 32 mm., the internal diameter of outer well 43 is preferably 39 mm., the internal diameter of inner well 41 is preferably 16 mm. and the height of hollow tube 42 is preferably 27 mm. It is understood that the above dimensions may vary according to alternative embodiments of the invention.

It can be seen from FIG. 18 that hollow tube 42 serves the additional function of providing an overflow alternative should the level of liquid in outer well 43 become too high. The top of hollow tube 42 is slightly lower than the top of wall 44 which encloses outer well 43 and has formed therein a number of slots. Accordingly, any liquid introduced into outer well 43 which causes the quantity of liquid therein to exceed the height of hollow tube 42 will flow into inner well 41 rather than overflow wall 44.

The method of making café au lait employing the embodiment of FIGS. 10–18 varies slightly from the method of making café au lait employing the embodiment of FIGS. 1–5. According to the embodiment of FIGS. 1–5, the milk is introduced directly into the drinking vessel and the hot coffee is introduced into well 12 and flows through holes 18 onto the milk within the drinking vessel. According to the embodiment of FIGS. 10–18, the milk is introduced directly into the drinking vessel and the hot coffee is introduced into both inner well 41 and outer well 43. The coffee flows through hole 47 and through perforated surface 48 into the drinking vessel at different rates. The respective pathways are designed such that the coffee flows relatively rapidly through hole 47 and flows relatively slowly and in a diffused fashion through perforated surface 48. Accordingly, the coffee from inner well 41 is introduced in such a manner that it mixes with the milk causing the formation of a light brown layer, while the coffee from outer well 43 does not pierce the surface of the milk and remains "floating" above it without mixing therewith, resulting in a darker brown layer.

The alternate embodiment shown in FIGS. 10–18 allows the preparer freedom to regulate the quantity of the coffee to be mixed with the milk. There are three different methods of employing the alternative embodiment. The first method comprises filling both inner well 41 and outer well 43 to their respective capacities with hot coffee. This will result in a measured quantity of coffee equal to the capacity of inner well 41 being introduced through hole 47 and mixing with the milk, and the remainder of the coffee passing through holes 48a, 48b and 48c remaining above the milk without mixing with it. The second method includes pouring a different quantity of coffee into inner well 41 such that it will mix with the milk and pouring the remainder of the coffee into outer well 43 such that it will remain floating above the milk. This method allows the preparer to vary the proportion of coffee mixed with the milk and coffee not mixed with the milk according to desire. The third method consists of not using inner well 41 and pouring all of the coffee into outer well 43 so that all of the coffee remains floating over the milk and none is mixed with it.

Flow restrictor 40 and supporting member 50 are separately configured and may be fabricated independently of one another. Accordingly, the embodiment of FIGS. 10–18 is particularly suited to be marketed as a kit, with flow restrictor 40 being provided as a disposable unit fabricated of an inexpensive plastic material, and supporting member 50 being provided as a permanent element fabricated of a decorative and durable substance such as stainless-steel or other appropriate material.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. A device for preparing a beverage in a drinking vessel having an open top, said beverage including a first liquid and a second liquid of lower density than said first liquid, said device comprising a flow restrictor member through which said second liquid is transferred into said drinking vessel after said first liquid has been introduced therein, said flow restrictor member being formed with a plurality of holes therein of such size, number and distribution to permit said second liquid to flow therethrough at a rate such that said second liquid forms a distinct layer over said first liquid with a minimum of turbulence and mixing with respect to said first liquid;

wherein said flow restrictor member is carried by a container containing said second liquid, such that said second liquid is transferred from said container into said drinking vessel through said flow restrictor; and wherein said container has an openable lid incorporating said flow restrictor member.

2. The device according to claim 1, wherein said flow restrictor member is constructed so as to be removably supportable on said open top of the drinking vessel at the time that said second liquid is transferred into said drinking vessel over said first liquid.

3. The device according to claim 2, wherein the flow restrictor member includes an inner well section for receiving a quantity of the second liquid, said inner well section having a bottom wall formed with said plurality of holes; and an outer supporting section circumscribing said inner well section, said outer supporting section being engageable with said open top of said drinking vessel for removably supporting said flow restrictor member on said drinking vessel.

4. The device according to claim 3, wherein said outer supporting section includes a peripheral wall mounting said well section centrally therein, said peripheral wall extending below the bottom wall of said well section and terminating in a peripheral flange engageable with said open top of the drinking vessel for removably supporting said flow restrictor member on said drinking vessel.

5. The device according to claim 4, wherein said peripheral wall is formed with holes to permit vapor to pass therethrough.

6. A device for preparing a beverage in a drinking vessel having an open top, said beverage including a first liquid and a second liquid of lower density than said first liquid, said device comprising a flow restrictor member through which said second liquid is transferred into said drinking vessel after said first liquid has been introduced therein, said flow restrictor member being formed with a plurality of holes therein of such size, number and distribution to permit said second liquid to flow therethrough at a rate such that said second liquid forms a distinct layer over said first liquid with a minimum of turbulence and mixing with respect to said first liquid;

wherein said flow restrictor member includes a peripheral wall, a bottom wall formed with said plurality of holes and a hollow tube fixed centrally to said bottom wall to define, within said hollow tube, an inner well of relatively small volume and, between said hollow tube and said peripheral wall, an outer well of greater volume, said bottom wall being formed with at least one further hole communicating with said inner well of larger diameter than each of said plurality of holes, such that said second liquid within said inner well flows out from said at least one further hole into said drinking vessel at a higher flow rate than that of said second liquid from said outer well through each of said plurality of holes in said bottom wall.

7. The device according to claim 6, wherein said peripheral wall is of greater height than said hollow tube.

8. The device according to claim 6, wherein said hollow tube is formed with slots at its upper end to allow overflow of said second liquid within said outer well into said inner well.

9. The device according to claim 6, wherein said bottom wall includes a single hole communicating with said inner well and an annular my of holes communicating with said outer well; said single hole having a relatively larger dimension for allowing said second liquid to discharge relatively rapidly therethrough such that said second liquid pierces the surface of said first liquid and mixes therewith, each of said annular array of holes having relatively smaller dimensions for allowing said second liquid to discharge relatively slowly therethrough such that said second liquid does not appreciably pierce the surface of said first liquid and does not appreciably mix therewith.

10. The device according to claim 6, further comprising a supporting member for removably supporting said flow restrictor member over said open top of said drinking vessel, said supporting member having a peripheral wall formed with a top rim for removably mounting said flow restrictor member centrally therein, said peripheral wall extending below said flow restrictor member and terminating in a peripheral flange engageable with said open top of the drinking vessel for removably supporting said flow restrictor member on said drinking vessel.

11. The device according to claim 10, wherein said peripheral wall of said supporting member is formed with holes to permit vapor to pass therethrough.

12. The device according to claim 10, wherein said peripheral wall of said cylindrical receptacle has a protruding lip radiating circumferentially from the top thereof for removably engaging said top rim of said supporting member.

13. The device according to claim 6, wherein said flow restrictor member is of a plastic material disposable after use.

14. The device according to claim 13, wherein said supporting member is of a metal for multiple use.

* * * * *